United States Patent
Lee et al.

(10) Patent No.: US 11,494,643 B2
(45) Date of Patent: Nov. 8, 2022

(54) NOISE DATA ARTIFICIAL INTELLIGENCE APPARATUS AND PRE-CONDITIONING METHOD FOR IDENTIFYING SOURCE OF PROBLEMATIC NOISE

(71) Applicants: Hyundai Motor Company, Seoul (KR); Kia Motors Corporation, Seoul (KR); IUCF-HYU (Industry-University Cooperation Foundation Hanyang University), Seoul (KR)

(72) Inventors: Dong-Chul Lee, Anyang-si (KR); In-Soo Jung, Suwon-si (KR); Joon-Hyuk Chang, Seoul (KR); Kyoung-Jin Noh, Seoul (KR)

(73) Assignees: Hyundai Motor Company, Seoul (KR); Kia Motors Corporation, Seoul (KR); IUCF-HYU (Industry-University Corporation Foundation Hanyang University), Seoul (KR)

( * ) Notice: Subject to any disclaimer, the term of this patent is extended or adjusted under 35 U.S.C. 154(b) by 501 days.

(21) Appl. No.: 16/687,499

(22) Filed: Nov. 18, 2019

(65) Prior Publication Data

US 2020/0193291 A1 Jun. 18, 2020

(30) Foreign Application Priority Data

Dec. 13, 2018 (KR) .......................... 10-2018-0160833

(51) Int. Cl.
*G10L 25/30* (2013.01)
*G06N 3/08* (2006.01)
*G06N 3/04* (2006.01)

(52) U.S. Cl.
CPC ............. *G06N 3/08* (2013.01); *G06N 3/0445* (2013.01); *G06N 3/0454* (2013.01); *G10L 25/30* (2013.01)

(58) Field of Classification Search
CPC ......... G06N 3/08; G06N 3/0454; G10L 25/30
See application file for complete search history.

(56) References Cited

U.S. PATENT DOCUMENTS 9,336,259 B1 * 5/2016 Kane .................... G06F 11/3409
10,803,885 B1 * 10/2020 Kao ........................ G10L 25/51
(Continued)

FOREIGN PATENT DOCUMENTS

CN  108445868 A  8/2018
DE  10 2017 221 701 A1  4/2019
(Continued)

OTHER PUBLICATIONS

Yasir Hassan Ali et al, "Acoustic Emission Signal Analysis and Artificial Intelligence Techniques in Machine Condition Monitoring and Fault Diagnosis: A Review," *Jurnal Teknologi*, pp. 121-1216 (2014).

(Continued)

*Primary Examiner* — Bryan S Blankenagel
(74) *Attorney, Agent, or Firm* — Morgan, Lewis & Bockius LLP

(57) ABSTRACT

A noise data artificial intelligence learning method for identifying the source of problematic noise may include a noise data pre-conditioning method for identifying the source of problematic noise including: selecting a unit frame for the problematic noise among noises sampled with time; dividing the unit frame into N segments; analyzing frequency characteristic for each segment of the N segments and extracting a frequency component of each segment by applying Log Mel Filter; and outputting a feature parameter (Continued)

as one representative frame by averaging information on the N segments, wherein an artificial intelligence learning by the feature parameter extracted according to a change in time by the noise data pre-conditioning method applies Bidirectional RNN.

8 Claims, 5 Drawing Sheets

(56) References Cited

U.S. PATENT DOCUMENTS

| | | | |
|---|---|---|---|
| 2009/0115635 A1* | 5/2009 | Berger | G10L 25/51 340/943 |
| 2015/0094835 A1* | 4/2015 | Eronen | G10H 1/0008 700/94 |
| 2016/0071336 A1 | 3/2016 | Owen et al. | |
| 2017/0148431 A1 | 5/2017 | Catanzaro et al. | |
| 2019/0052747 A1* | 2/2019 | Breaux | G06V 20/593 |
| 2019/0114849 A1 | 4/2019 | Lee et al. | |
| 2020/0175335 A1* | 6/2020 | Li | G06N 20/00 |
| 2020/0349928 A1* | 11/2020 | Mandal | G06N 3/0454 |

FOREIGN PATENT DOCUMENTS

| | | |
|---|---|---|
| EP | 3 637 083 A1 | 4/2020 |
| JP | 2013-200143 A | 10/2013 |
| KR | 1995-0009238 A | 4/1995 |
| KR | 10-2016-0101437 A | 8/2016 |
| KR | 10-2018-0029320 A | 3/2018 |
| KR | 10-2018-0029543 A | 3/2018 |
| KR | 10-2019-0042203 A | 4/2019 |

OTHER PUBLICATIONS

Giambattista Parascandolo et al, "Recurrent Neural Networks for Polyphonic Sound Event Detection in Real Life Recordings," *IEEE*, pp. 6440-6444 (2016).

J.-D. Wu et al, "Faults Classification of a Scooter Engine Platform Using Wavelet Transform and Artificial Neural Network, *Proceedings of the IMECS*," vol. 1:1-6 (2009).

* cited by examiner

NOISE DATA ARTIFICIAL INTELLIGENCE APPARATUS AND PRE-CONDITIONING METHOD FOR IDENTIFYING SOURCE OF PROBLEMATIC NOISE

CROSS-REFERENCE TO RELATED APPLICATION

The present application claims priority to Korean Patent Application No. 10-2018-0160833, filed on Dec. 13, 2018, the entire contents of which is incorporated herein for all purposes by this reference.

BACKGROUND OF THE PRESENT INVENTION

Field of the Invention

The present invention relates to a noise data artificial intelligence apparatus and a pre-conditioning method for identifying the source of problematic noise, as a Deep Learning based artificial intelligence problematic noise source diagnostic technology for irregular noise such as vehicle noise, in particular, power train noise.

Description of Related Art

A vehicle is a finished body having many parts assembled therein.

The power system of the vehicle has inherent noise and vibration characteristics.

However, the noise information generated by a combination of many parts is very large.

The noise is different from operating noise in a normal case and problematic noise in an abnormal case.

When the problematic noise occurs, the vehicle is often placed in an abnormal state.

However, it is very difficult to determine which portion of the vehicle has a failure by use of only problematic noise information generated by the vehicle having a very complicated structure.

For example, in the case of a powertrain of the vehicle, it is very difficult to find the area where the problematic noise occurs.

This is because the problematic noise of the vehicle occurs irregularly.

Therefore, conventionally, noise experts have diagnosed it through sound evaluation and have found the source of the problematic noise depending upon their past experience.

At the present time, it may take a long time even if many noise experts use a sensor or other test conditions.

Nevertheless, it was very difficult to accurately diagnose the source of the problematic noise.

Recently, efforts have been made to find the source of the problematic noise by use of noise data, but there is no proper solution therefor.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a noise data artificial intelligence apparatus and a pre-conditioning method for identifying the source of problematic noise for maximizing the asset value of the noise big data accumulated for each type of noise data by use of an artificial intelligence technique.

The present invention includes a noise data artificial intelligence learning method for identifying the source of problematic noise including a noise data pre-conditioning method for identifying the source of problematic noise including selecting a unit frame for the problematic noise among noises sampled with time; dividing the unit frame into N segments; analyzing frequency characteristic for each segment of the N segments and extracting a frequency component of each segment by applying Log Mel Filter; and outputting a feature parameter as one representative frame by averaging information on the N segments, and an artificial intelligence learning by the feature parameter extracted according to a change in time by the noise data pre-conditioning method applies Bidirectional RNN.

Furthermore, the sampling samples in the range of twice a problematic frequency band.

Furthermore, an overlap is set between the unit frame with time and a next unit frame.

Furthermore, the artificial intelligence learning additionally is configured to apply Deep Neural Network (DNN).

Furthermore, the artificial intelligence learning additionally applies Attention Mechanism.

Furthermore, the artificial intelligence learning is configured to additionally apply an Early stage ensemble algorithm.

Furthermore, when the time axis of the problematic noise learning data is constantly collected, an Ensemble model of jointly trained RNNs algorithm using both a time-frequency map and an engine RPM-frequency map for improving the accuracy is additionally applied.

Furthermore, in a noise data artificial intelligence diagnostic apparatus implemented with a noise data artificial intelligence learning method for identifying the source of problematic noise, the noise of a vehicle or a powertrain is directly measured by an input means of the apparatus, or the stored noise data is provided through a storage medium.

Firstly, it is possible to apply the concept of the multiple diagnostic system configured for outputting the diagnostic result for the noise source input from $1^{st}$ to $n^{th}$ in a probabilistic technique considering the complicated noise source in the powertrain, diagnosing the source of the problematic noise having low characteristic.

Secondly, it is possible to generate the model learned based on the big data for the problematic noise of the powertrain, probabilistically diagnosing precisely the complex and irregular powertrain noise or the vehicle noise.

Thirdly, it is possible to accurately diagnose the source of the problematic noise in a very short time.

Fourthly, it is possible to use GRU, DNN, Attention Mechanism, and Early Stage ensemble algorithms, preventing the data for past time from being lost.

Fifthly, it is possible to additionally apply the weight of the important portion of the learning data by applying the Attention Mechanism, accurately establishing the learning model for the irregular noise.

Sixthly, it is possible to efficiently improve the effort required for data analysis and determination by a person (professional engineer).

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
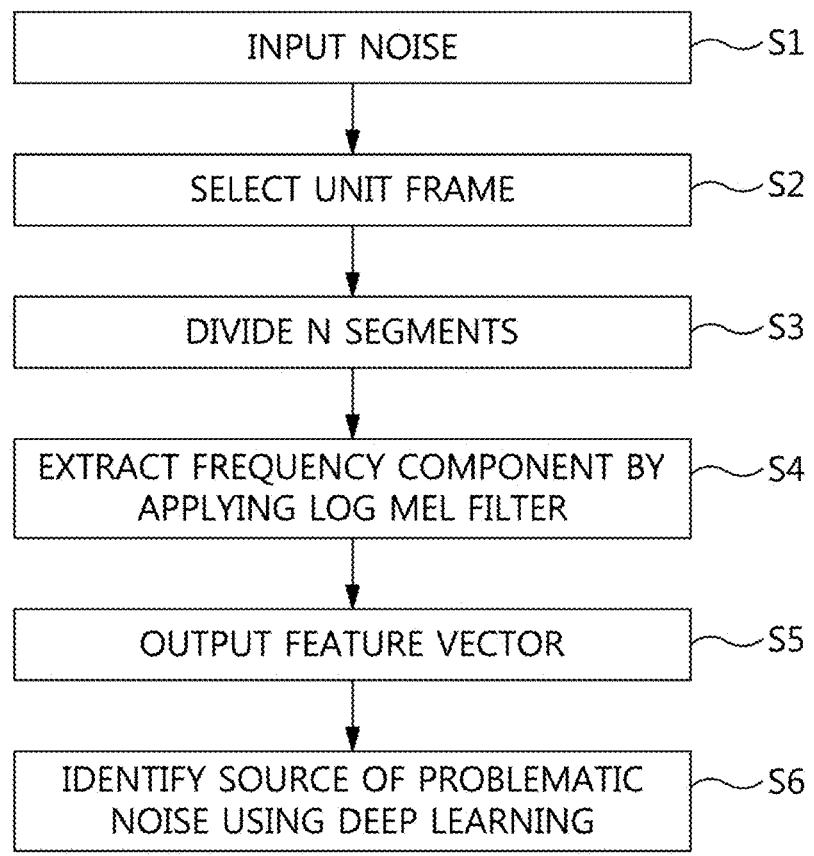
FIG. 1 is an entire flowchart according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents, and other embodiments, which may be included within the spirit and scope of the present invention as defined by the appended claims.

Various modifications and various embodiments may be made in accordance with various aspects of the present invention, so that specific embodiments are illustrated in the drawings and described in detail in the specification. It may be understood, however, that it is not intended to limit the present invention to the particular included forms, but includes all modifications, equivalents, and alternatives falling within the spirit and technical scope of the present invention.

Like reference numerals are used for like elements in describing each drawing.

The terms "first," "second," and the like may be used to illustrate different components, but the components may not be limited by the terms. The terms are used to differentiate one element from another.

For example, a first component may be referred to as a second component, and similarly, the second component may be also referred to as the first component without departing from the scope of the present invention. The terms "and/or" includes a combination of plurality of related listed items or any of a plurality of related listed items.

Unless otherwise defined, all terms including technical and scientific terms used herein have the same meaning as commonly understood by one of ordinary skill in the art to which an exemplary embodiment of the present invention belongs.

It will be further understood that terms, such as those defined in commonly used dictionaries, may be additionally interpreted as having a meaning which is consistent with their meaning in the context of the relevant art, and will not be interpreted in an idealized or overly formal sense unless expressly so defined in the application.

A noise data pre-conditioning method for identifying the source of problematic noise of the present invention will be described.

Any noise is a noise that does not know the information related to the type and the source of problematic noise required for diagnosis.

As will be described later, the present invention may use the measured engine RPM information simultaneously with any noise.

Meanwhile, if necessary, it is possible to diagnose by use of any noise as an input without engine RPM information.

FIG. 1 is the entire flowchart according to an exemplary embodiment of the present invention. In the instant case, the entire flowchart is described with reference to a noise data pre-conditioning device 100-1 of FIG. 2.

First, any noise is input S1 through a noise data input unit 110 of the noise data pre-conditioning device 100-1.

A unit frame is selected for problematic noise among the noises sampled with time S2 through a noise data learning unit 100.

The unit frame is divided into N segments S3 through a segment divider 200.

At the present time, the sampling with time is sampled within a range of twice the problematic frequency band.

In an exemplary embodiment of the present invention, the sampling operation is referred to as pre-conditioning of noise big data.

The pre-conditioning of big data is required for diagnostic learning considering the characteristics of the powertrain, and it is important to analyze the noise characteristics of the powertrain.

The pre-conditioning of noise big data is used for learning to extract a feature parameter of the learning having high accuracy.

It is preferable to perform re-sampling by a Frequency sampling, which is twice the noise frequency to be diagnosed as a method used in the pre-conditioning of noise big data.

Furthermore, the overlap is set between the unit frame with time and the next unit frame.

The overlap may also be present between the unit frames.

The overlap may also be present even when one unit frame is divided into N segments.

The overlap is directed to prevent the loss of data.

The frequency characteristic is analyzed for each segment and a frequency component is extracted by applying a Log Mel filter S4 through a segment analyzer 300 and an average value generator 400.

The Log Mel Filter is used to use both a low frequency component and a high frequency component.

A feature vector (feature parameter) is output as one representative frame by averaging the information related to the segment S5 through a learning model integrator 500, a learning model generator 600 and a feature parameter extractor 610.

The feature parameter is a dimensionless concept, and the feature vector is a concept having a dimension, and the feature parameter may be a higher concept than the feature vector.

However, herein, the feature vector and the feature parameter may be understood as a similar concept.

In an exemplary embodiment of the present invention, the sampling operation is referred to as pre-conditioning of noise big data.

Meanwhile, the output feature vector may be used as an input value for artificial intelligence learning of an artificial intelligence learning machine 700.

Artificial intelligence logic 710 of the artificial intelligence learning machine 700 finally identifies the source of the problematic noise by use of the feature vector S6.

The artificial intelligence logic 710 may be understood in a similar sense as Deep Learning or machine learning, machine learning, and the like.

The artificial intelligence learning utilizes the feature parameters according to the change in time, and therefore, may confirm all the irregular features that are the noise characteristic of the powertrain.

At the present time, the artificial intelligence learning may apply Bidirectional RNN (GRU: Gated Recurrent Unit).

The Gated Recurrent Unit (GRU) is one of a Recurrent Neural Network (RNN) technique, and therefore, may construct an artificial intelligence learning model according to the change in time.

Meanwhile, it may be considered that the artificial intelligence learning may additionally apply Deep Neural Network (DNN).

The Deep Neural Network (DNN) may be used as an algorithm for improving the probabilistic accuracy of Many to one.

At the present time, it may be preferable to apply a soft max technique.

The Many to one diagnosis technique is a technique for diagnosing the source of the problematic noise for time flow.

Furthermore, it may be preferable that the artificial intelligence learning additionally applies Attention Mechanism.

The Attention Mechanism may be used to improve the information loss of past time data.

The Attention Mechanism is a learning technique for weighing the important feature vector in the time axis.

That is, the Attention Mechanism may establish an accurate learning model for the irregular noise by additionally applying the weight of the important portion of the learning data.

At the present time, it may be preferable to apply by combining the Bidirectional RNN (GRU).

Accordingly, the artificial intelligence learning may additionally apply the Early stage ensemble algorithm.

The Early stage ensemble algorithm is a weighted learning technique for emphasizing the importance of the past time data among the problems of the Recurrent Neural Network (RNN), which is the upper concept of the GRU.

That is, the Early stage ensemble technique may be used to maintain information by dividing the weights for the initial time and the final time evenly.

Figure 2:
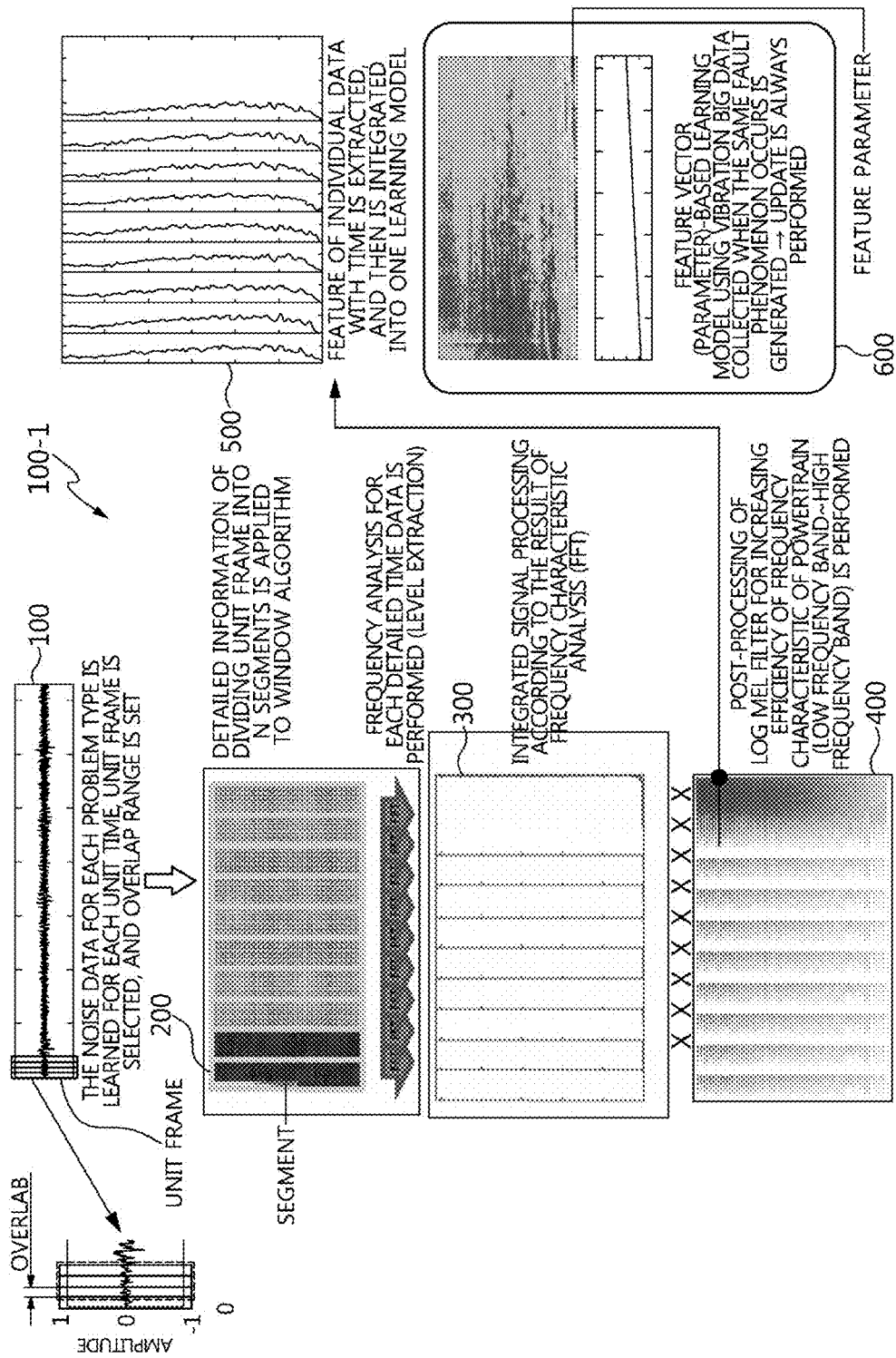
FIG. 2 illustrates noise data pre-conditioning for each type according to an exemplary embodiment of the present invention.

FIG. 2 illustrates noise data pre-conditioning for each type according to an exemplary embodiment of the present invention.

Figure 3:
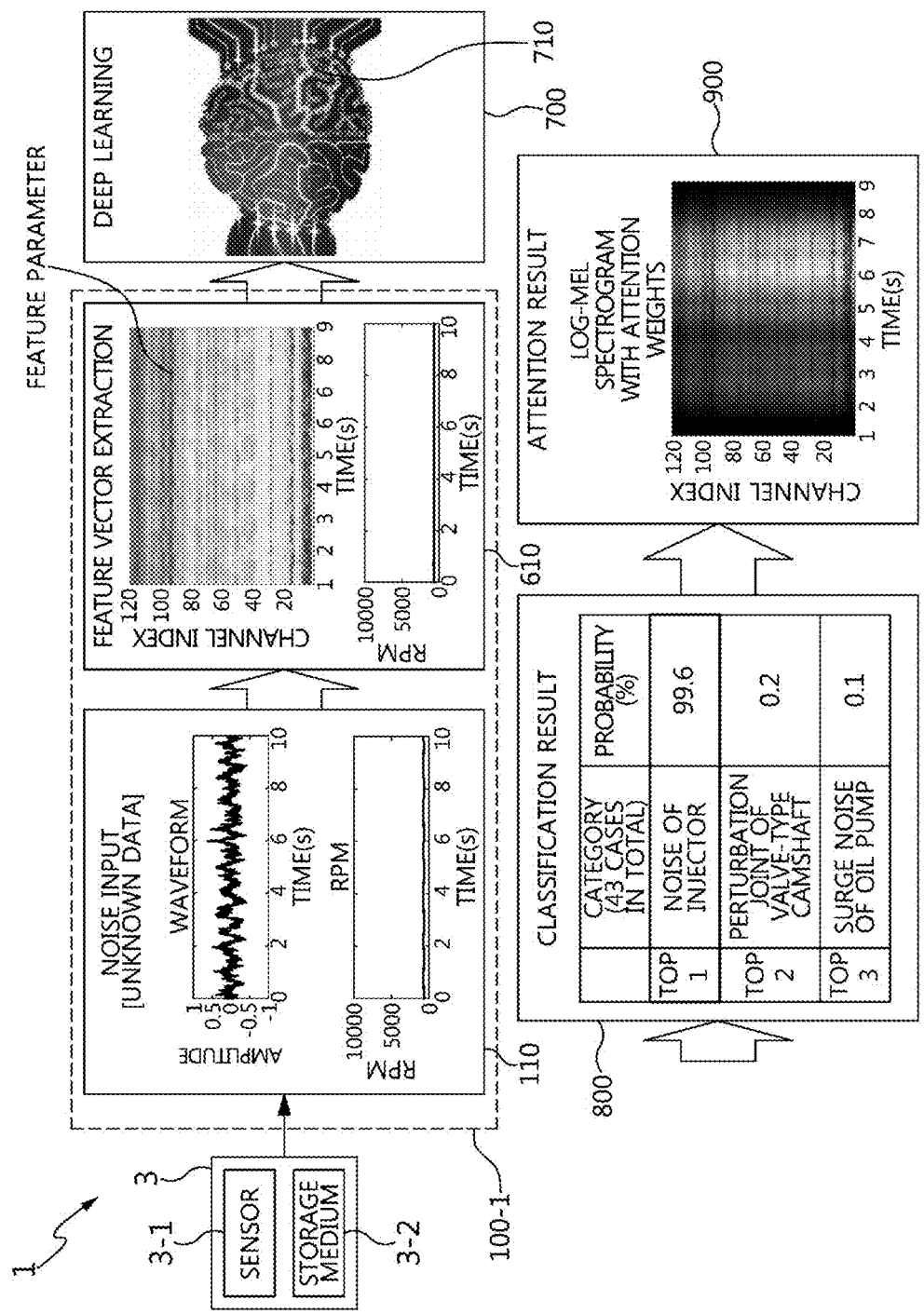
FIG. 3 illustrates a procedure of diagnosing by inputting any noise data to an artificial intelligence learning model according to an exemplary embodiment of the present invention.

FIG. 3 illustrates a procedure of diagnosing by inputting any noise data to the artificial intelligence learning model according to an exemplary embodiment of the present invention.

Referring to FIG. 2 and FIG. 3, a noise data artificial intelligence diagnostic apparatus 1 is possible to provide an apparatus implemented with a noise data artificial intelligence learning method for identifying the source of the problematic noise. The noise data artificial intelligence diagnostic apparatus 1 includes an input device 3, a noise data pre-conditioning device 100-1, an artificial intelligence learning machine 700, a problematic noise source identifier 800 and a problematic noise determiner 900

The input device 3 is possible to directly measure the noise of the vehicle or the powertrain by a noise measurement sensor 3-1, or to provide the stored noise data through a storage medium 3-2. That is, the storage medium 3-2 stores the noise data, and therefore, it is also possible to apply it to the artificial intelligence learning model.

The noise data pre-conditioning device 100-1 includes a noise data learning unit 100, a noise data input unit 110, a segment divider 200, a segment analyzer 300, an average value generator 400, a learning model integrator 500, a learning model generator 600 and a feature parameter extractor 610.

The operation of the noise data artificial intelligence diagnostic apparatus 1 is as follows.

First, the noise data for each problem type is learned for each unit time by the noise data learning unit 100.

The noise data of the noise data input unit 110 to be input is any noise.

At the present time, the unit frame is selected and the overlap range is selected.

There are various types of vehicle noise, and the type of vehicle noise that occurs irregularly is as follows.

That is, there are the problematic noise generating in a short time and the problematic noise generating for a long time as the problematic noise generated according to the length of time.

Furthermore, there is the problematic noise of a specific frequency component as the problematic noise generated according to a frequency component.

The noise data pre-conditioning for each type of the present invention considers both the temporal characteristic and the frequency component characteristic.

That is, the time axis is divided into one frame unit to include both the noise characteristics that change with time and from low-frequency component to high-frequency component.

The reason for dividing into one frame unit is to accurately determine the noise characteristics that change with time.

Accordingly, the overlap between one divided frame and a next frame is set.

At the present time, a ratio of the overlap is uniformly applied.

One frame is divided into N segments (i.e., a total of nine segments) by the segment divider 200 and analyzed frequency characteristic for each segment by the segment analyzer 300 to apply the Log Mel Filter.

The result of applying Log Mel Filter is output as an average value of the average value generator 400.

This corresponds to the post-processing operation for increasing the efficiency of the frequency characteristics from the low frequency band to the high frequency band.

Thereafter, the feature of the individual data with time is extracted, and then is integrated into one learning model of the learning model integrator 500.

Next, a feature vector (parameter)-based learning model using the vibration big data collected when the same fault phenomenon occurs is generated through the learning model generator 600.

The artificial intelligence learning machine 700 may obtain the classification result of the problematic noise source identifier 800 by identifying the source of the problematic noise by use of the extracted feature vector (parameter) of the feature parameter extractor 610.

Furthermore, the artificial intelligence learning machine 700 may output highly meaningful data among all the noises as an attention result of the problematic noise determiner 900.

The Attention result of the problematic noise determiner 900 may be used to apply a technique using when a Noise, vibration, harshness (NVH) expert group analyzes the noise, and supplements the disadvantages of the analysis for the irregular time data in that the weight of the recent data is increased and the weight of the initial data is reduced.

Figure 4:
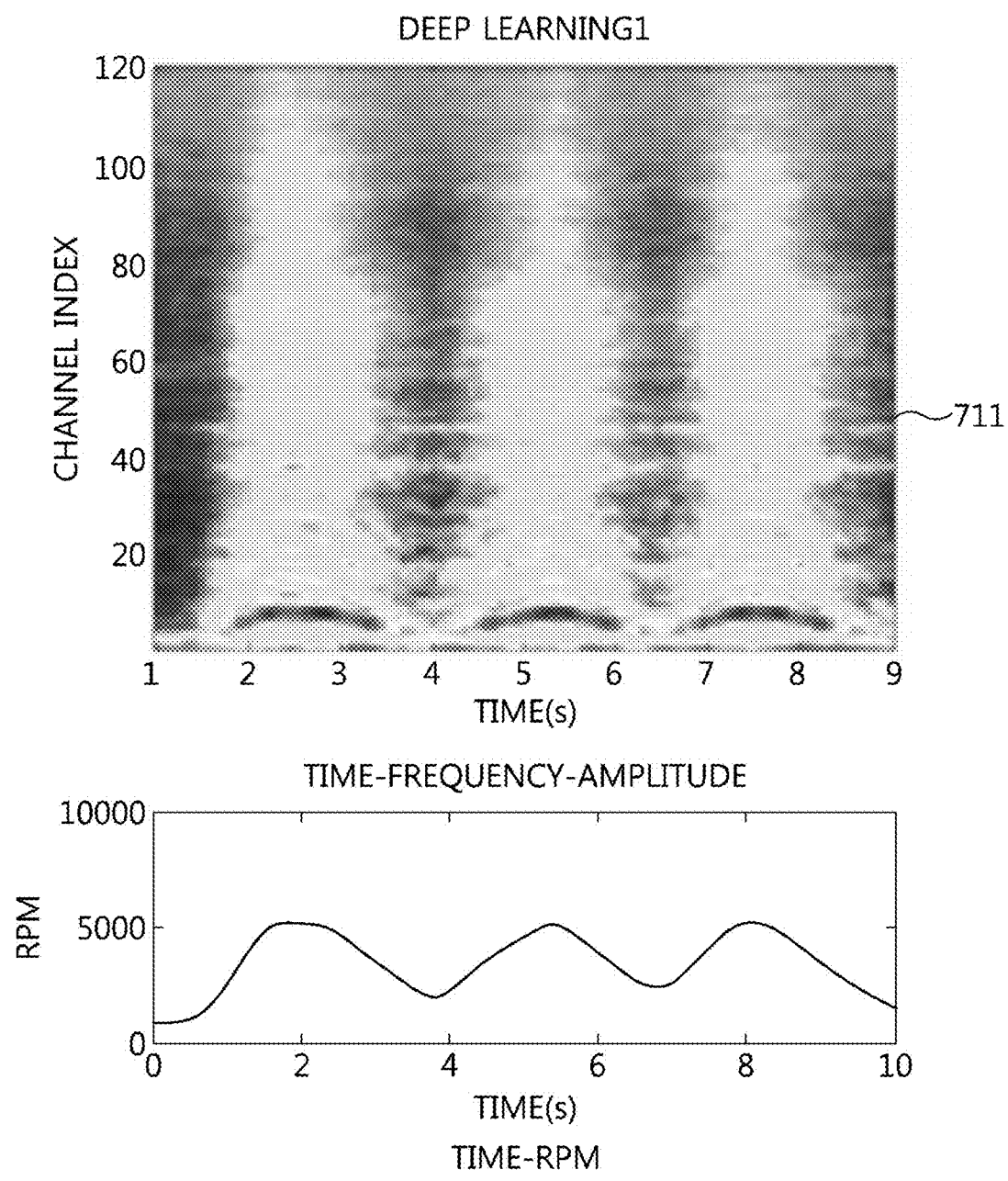
FIG. 4 illustrates a time-frequency map used in the artificial intelligence learning according to an exemplary embodiment of the present invention.
Figure 5:
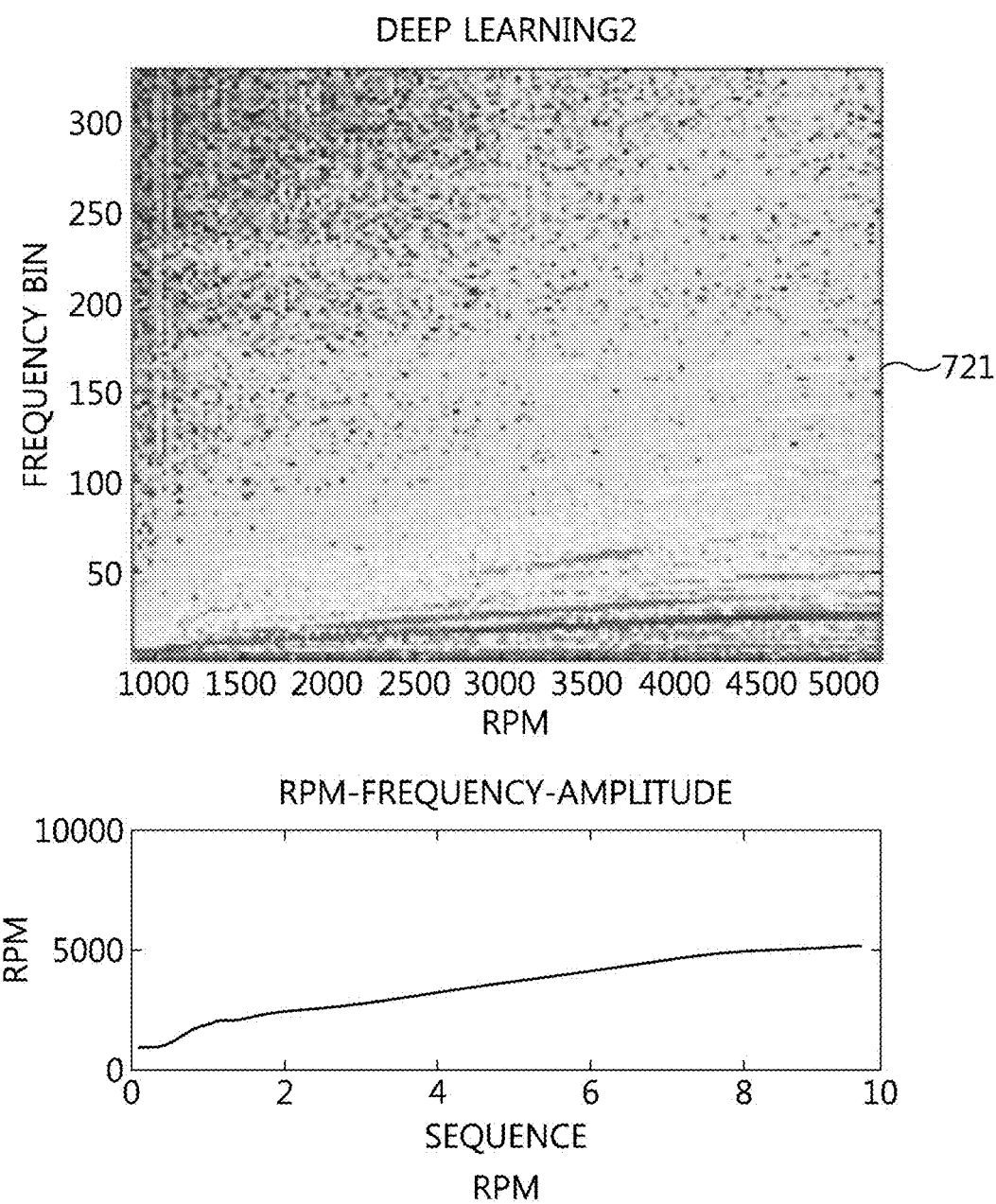
FIG. 5 illustrates an engine RPM-frequency map according to an exemplary embodiment of the present invention.

FIG. 4 illustrates a time-frequency map 711 used by the artificial intelligence learning according to an exemplary embodiment of the present invention, and FIG. 5 illustrates an engine RPM-frequency map 721 according to an exemplary embodiment of the present invention.

When the time axis of the problematic noise learning data is constantly collected, the Ensemble model of jointly trained RNNs algorithm may be used to improve the accuracy.

The Ensemble model of jointly trained RNNs algorithm is an algorithm that utilizes both the time-frequency map 711 and the engine RPM-frequency map 721.

The Ensemble model of jointly trained RNNs algorithm is also called a Jointed time and rpm MAP analysis technique.

At the present time, the case where the time axis of the problematic noise learning data is constantly collected indicates a case of being synchronized based on the same time.

For example, when the time axis of all the learning data and the input data for diagnosis are 10 seconds, in the case of the same time measurement data, the noise data is regularly collected on the time axis.

Meanwhile, as yet another exemplary embodiment of an apparatus implemented with a noise data artificial intelligence learning method for identifying the source of the problematic noise, it is possible to apply any noise and an engine RPM signal to measurable portable equipment.

As a result, it is possible to analyze any measured noise by applying a PC-based or analyzer-based system.

The present invention is a technology for accurately diagnosing the source of the problematic noise in a very short time by use of the noise data, and may output the diagnosis result of the problematic noise source identifier 800 within about 5 seconds.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A noise data artificial intelligence learning method of identifying and diagnosing a source of problematic noise in a power train of a vehicle including a memory for storing noise data and vibration data and a processor configured to execute instructions stored in the memory, the method comprising:
a noise data pre-conditioning method for identifying the source of the problematic noise, including:
selecting, by the processor, a unit frame for the problematic noise among noises sampled with time;
dividing, by the processor, the unit frame into N segments;
analyzing, by the processor, frequency characteristic for each segment of the N segments and extracting a frequency component of each segment by applying Log Mel Filter; and
outputting, by the processor, a feature parameter as one representative frame by averaging information on the N segments,
wherein the output feature parameter is used as an input value for an artificial intelligence learning of an artificial intelligence learning machine,
wherein the artificial intelligence learning by the feature parameter extracted according to a change in time by the noise data pre-conditioning method applies a Bidirectional Recurrent Neural Network (RNN) including a Gated Recurrent Unit (GRU),
wherein the artificial intelligence learning additionally is configured to apply a Deep Neural Network (DNN) for improving a probabilistic accuracy of a Many to one diagnosis technique,
wherein the artificial intelligence learning is configured to additionally apply an Attention Mechanism for improving an information loss of past time data,
wherein the artificial intelligence learning is configured to additionally apply an Early stage ensemble algorithm for emphasizing importance of the past time data among problems of the RNN, and
wherein when a time axis of problematic noise learning data is constantly collected, an Ensemble model of jointly trained RNN algorithms using a time-frequency map and an engine RPM-frequency map for improving accuracy is additionally applied.

2. The noise data artificial intelligence learning method of identifying the source of the problematic noise of claim 1, wherein the sampling is configured to sample in a range of twice a problematic frequency band.

3. The noise data artificial intelligence learning method of identifying the source of the problematic noise of claim 1, wherein an overlap is set between the unit frame with time and a next unit frame.

4. A noise data artificial intelligence diagnostic apparatus implemented with the noise data artificial intelligence learning method of identifying the source of the problematic noise of claim 1, wherein a noise of a vehicle or a powertrain is directly measured by an input device of the apparatus, or stored noise data is provided through a storage medium.

5. A noise data artificial intelligence learning method of identifying the source of the problematic noise of claim 1, wherein an artificial intelligence logic of the artificial intelligence learning machine is configured to finally identify the source of the problematic noise by use of the feature parameter.

6. The noise data artificial intelligence learning method of identifying the source of the problematic noise of claim 1, wherein the Many to one diagnosis technique is used for diagnosing the source of the problematic noise for time flow.

7. The noise data artificial intelligence learning method of identifying the source of the problematic noise of claim 1, wherein the Attention Mechanism is used for establishing an accurate learning model for the problematic noise by additionally applying weights of an important portion of learning data.

8. The noise data artificial intelligence learning method of identifying the source of the problematic noise of claim 1, wherein the Early stage ensemble algorithm is used for maintaining information by dividing weights for an initial time and a final time evenly in the learning data.

* * * * *